(12) United States Patent
Kong

(10) Patent No.: US 6,602,609 B1
(45) Date of Patent: Aug. 5, 2003

(54) MULTILAYER POLYMERIC FILM WITH NON-MIGRATORY ANTIBLOCK AGENT

(75) Inventor: Dan-Cheng Kong, Fairport, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/544,960

(22) Filed: Apr. 7, 2000

(51) Int. Cl.$^7$ .................... B32B 27/32; B32B 27/18
(52) U.S. Cl. .................. 428/447; 428/483; 428/523; 428/516; 428/910
(58) Field of Search ................ 428/516, 41.8, 428/424.2, 447, 483, 523, 910

(56) References Cited

U.S. PATENT DOCUMENTS

| | | | | |
|---|---|---|---|---|
| 3,686,355 A | | 8/1972 | Gaines, Jr. et al. | 260/824 R |
| 3,691,257 A | | 9/1972 | Kendrick et al. | 260/827 |
| 4,594,134 A | | 6/1986 | Hanada et al. | |
| 4,647,643 A | * | 3/1987 | Zdrahala et al. | 528/28 |
| 4,652,618 A | | 3/1987 | Sumida et al. | |
| 4,734,317 A | | 3/1988 | Bothe et al. | 428/215 |
| 4,769,418 A | | 9/1988 | Mizuno et al. | |
| 4,925,728 A | | 5/1990 | Crass et al. | 428/216 |
| 4,966,933 A | | 10/1990 | Kawakami et al. | 524/310 |
| 5,229,179 A | * | 7/1993 | Kumar et al. | 428/40 |
| 5,482,780 A | | 1/1996 | Wilkie | 428/515 |
| 5,489,473 A | | 2/1996 | Wilkie | 428/323 |
| 5,725,962 A | | 3/1998 | Bader et al. | 428/515 |
| 5,728,469 A | * | 3/1998 | Mann et al. | 428/418 |
| 5,753,363 A | | 5/1998 | Bader et al. | 428/331 |
| 5,792,549 A | | 8/1998 | Wilkie | 428/215 |
| 5,792,554 A | * | 8/1998 | Leir et al. | 428/352 |
| 5,798,174 A | | 8/1998 | Wilkie | 428/347 |
| 5,840,419 A | | 11/1998 | Adler | 428/327 |
| 5,858,552 A | | 1/1999 | Bader et al. | 428/519 |
| 5,972,496 A | | 10/1999 | Bader et al. | 428/331 |

FOREIGN PATENT DOCUMENTS

| | | | |
|---|---|---|---|
| GB | 2218428 | * | 11/1989 |
| JP | 8-92451 | * | 4/1996 |

OTHER PUBLICATIONS

Database WPI section Ch, week 199326 Derwent Publications Ltd., London, GB; Class A26 AN1993–208664 XP002180016 & JP 05 131772 A (ASIA GENSHI KK), May 28, 1993.

Database WPI Section Ch, Week 199624 Derwent Publications Ltd., London, GB; Class A14, AN 1996–236239 XP002180017 & JP 08 092451 A (CI KASEI CO LTD) Apr. 9, 1996.

* cited by examiner

*Primary Examiner*—D. Lawrence Tarazano
(74) *Attorney, Agent, or Firm*—Rick F. James; Keith A. Bell

(57) ABSTRACT

A multilayer polymeric film comprises:
  (a) a core layer comprising a thermoplastic polymer; and
  (b) at least one skin layer comprising a thermoplastic polymer and a non-migratory polydimethylsiloxane block copolymer.

20 Claims, No Drawings

MULTILAYER POLYMERIC FILM WITH NON-MIGRATORY ANTIBLOCK AGENT

FIELD OF THE INVENTION

The present invention relates to a multilayer polymeric film. More particularly, the present invention relates to a multilayer polymeric film with a skin layer having a non-migratory polydimethylsiloxane block copolymer.

BACKGROUND OF THE INVENTION

In the packaging of certain types of foods, such as snack foods including candies, potato chips, cookies and the like, it is common practice to employ a multi-layer film. Polypropylene films are widely used in the packaging industry due to their superior physical properties, such as, transparency, stiffness, moisture barrier characteristics and others. Despite these highly desirable properties, unmodified polypropylene film has the disadvantageous property of having a high inherent coefficient of friction and film-to-film destructive blocking on storage. This high film-to-film coefficient of friction makes polypropylene films, in their unmodified form, difficult to use in automatic packaging equipment.

Coefficient of friction characteristics of polypropylene and other thermoplastic films are beneficially modified by the inclusion of slip agents in the polymer. Most of these slip agents are migratory, such as polydiallyl siloxane or fatty amides, such as, erucamide and oleamide. Although they do reduce the coefficient of friction, their effectiveness depends upon the ability to migrate to the surface of the film. The development of the desired low coefficient of friction value is strongly dependent upon the type and amounts of amides, and time and temperature aging effects. Even the heat history of the film while in storage and shipping and during subsequent converter processes, significantly affects the coefficient of friction. In addition, the presence of these types of fatty acid amides on the film surface results in visible adverse appearance effects, manifested by an increase in haze, a decrease in gloss and the presence of streaks. These materials also adversely effect the wettability and adhesion of solvent and water-based inks, coatings and adhesives.

To overcome the problems associated with migratory slip agents, non-migratory systems were developed. A material described to be a non-migratory slip agent is a particulate crosslinked hydrocarbyl-substituted polysiloxane which is available worldwide from Toshiba Silicone Co., Ltd. and in the United States from General Electric Co. And marketed under the name TOSPEARL.

In PCT US94/14280 a film structure containing a non-migratory particulate crosslinked hydrocarbyl-substituted polysiloxane slip agent is described. The film structure includes at least one layer of an olefin homo-, co- or terpolymer having a surface-treated external surface which is printable, sealable and machinable The film has, as a combined slip agent and antiblock, a non-migratory particulate crosslinked hydrocarbyl-substituted polysiloxane, and/or liquid polymethyl siloxane. Example 7 provides a polypropylene core layer having (a) an outer skin layer of high density polyethylene containing particulate crosslinked polymonoalkylsiloxane as a non-migratory combined antiblock and slip agent and low density polyethylene. On the other side of the core layer is (c) an outer layer resin which also contains the non-migratory combined antiblock and slip agent. The film is flame treated on one side to improve the wettability and printability and lamination strengths. The size of the particulate in terms of average diameter is about $4.5\mu$. The target skin thickness of the (a) layer is three gauge units and four gauge units for the (c) layer The ratio of particle size in terms of average diameter to skin thickness is about 5.9 for the three gauge skin layer and about 4.42 for the four gauge skin layer. The film is described as having good coefficient of friction, on the treated side, and marginal machinability.

Additional descriptions of olefinic polymer films in which particulate siloxane resins are employed to provide improved films will be found in U.S. Pat. Nos. 4,966,933; 4,769,418; 4,652,618; and 4,594,134.

U.S. Pat. No. 4,966,933 describes a propylene polymer film containing 100 parts by weight of a propylene polymer, 0.01 to 0.5 parts by weight of a fine powder of a crosslinked silicone resin and 0.3 to 3.0 parts by weight of a hydroxy-fatty acid glyceride. In column 3, lines 6–20, the provided amounts of fine powder of silicone resin and hydroxy-fatty acid glyceride in the metallization layer are required for adaptability to vacuum deposition. Example 3 provides a two-layer coextruded film in which the fine powder of crosslinked silicone resin is compounded with polypropylene homopolymer to form a metallization layer (B) and the fine powder of crosslinked silicone resin is compounded with an ethylene/propylene/butene-1 copolymer to form a skin layer (A). The ratio of reported particle size to skin thickness is about 0.143 for skin layer (B) and about 1.29 for skin layer (A).

U.S. Pat. No. 4,734,317 to Bothe, et al. discloses a biaxially oriented multilayer polyolefin film which comprises a polypropylene base layer, a first polyolefin sealing layer positioned on one side of the base layer, and containing from about 0.5% to 3% by weight of incorporated polydialkylsiloxane, the first sealing layer not being subject to corona treatment, and a second polyolefin sealing layer positioned on the other side of the base layer and having a coating of the polydialkylsiloxane on its outer surface, the second sealing layer being subject to corona treatment, wherein the polydialkylsiloxane coating is formed by contact of the first and second layers.

U.S. Pat. No. 4,925,728 to Crass, et al. discloses a biaxially stretched multilayer film comprising a base layer essentially comprising polypropylene and at least one top layer, wherein the top layer essentially comprises (a) 98.5% to 99.6% by weight of a propylene homopolymer and (b) 0.4% to 1.5% by weight of a polydiorganosiloxane, relative to the top layer.

U.S. Pat. No. 5,482,780 to Wilkie, et al. discloses a polypropylene film with cold seal release and cold seal receptive surfaces, wherein a predominantly isotactic polypropylene homopolymer core has on one side thereof an ethylene-propylene random copolymer having a physically modified surface for reception of a cold seal cohesive composition and on the other side of the core there is a blend of an ethylene-butylene copolymer and an ethylene-propylene random copolymer containing a non-migratory slip agent. The preferred non-migratory slip agent is described as being a crosslinked silicone having a particle size of about 1 to 4.5 microns, such as that identified by TOSPEARL of Toshiba Company.

U.S. Pat. No. 5,489,473 to Wilkie discloses biaxially oriented polypropylene cold seal packaging films comprising at least one cold seal release layer and a cold seal receptive layer. The use of crosslinked silicone in the cold seal release skin layer is also disclosed.

U.S. Pat. No. 5,792,549 to Wilkie discloses a coextruded biaxially oriented polyolefin packaging film comprising a cold seal release layer, a core layer, and a cold seal receptive skin layer. The use of crosslinked silicone having a particle size of about 1 to about 4.5 microns such as that identified by TOSPEARL of Toshiba Company is also disclosed.

U.S. Pat. No. 5,798,174 to Wilkie discloses cold sealable films for heat sensitive packaging operations comprising, in order, a cold seal cohesive layer, a core layer, and a cold seal release layer comprising a mixture of about 1 to about 80% by weight butene-propylene copolymer and about 99 to 20% by weight butylene-ethylene copolymer.

U.S. Pat. No. 5,840,419 to Alder discloses a multilayer polyolefin film comprising a core layer of a propylene polymer and an outer polyolefin layer on the core layer, the outer polyolefin layer including a coefficient reducing amount of a particulate, partially crosslinked polysiloxane, which are preferably in the form of elastomeric particles including polysiloxane in the form of silicone oil. The patent states that the silicone oil is released when the particles are "subjected to mechanical stress."

U.S. Pat. No. 5,858,552 to Bader, et al. discloses a film structure having a first outer skin layer (a) of an olefin co- or terpolymer containing a non-migratory particulate crosslinked hydrocarbyl substituted polysiloxane, a core layer (b) and a second skin layer (c) of an ethylene polymer which is free of the particulate crosslinked hydrocarbyl substituted polysiloxane in layer (a).

Commonly-owned, copending U.S. application Ser. No. 09/026,454, which is incorporated herein by reference, discloses and claims a block resistant film comprising: (a) a core layer of a thermoplastic polymer, the core layer having a first side and a second side; (b) a functional layer which is printable or sealable or treatable for printing or sealing on the first side of the core layer; and (c) a block-resistant layer on the second side of the core layer comprising a thermoplastic polymer and an amount of polydialkylsiloxane, based upon the entire weight of the block-resistant layer, sufficient to inhibit blocking of the block-resistant layer to the functional layer when they are in contact and which polydialkylsiloxane deposits silicon onto the functional layer but the amount deposited is not substantially detrimental to the printing function or the sealing function.

SUMMARY OF THE INVENTION

There is provided a multilayer polymeric film comprising:
(a) a core layer comprising a thermoplastic polymer; and
(b) at least one skin layer comprising a thermoplastic polymer and a nonmigratory polydimethylsiloxane block copolymer.

DETAILED DESCRIPTION OF THE INVENTION

The core layer comprises a thermoplastic polymer which has properties suitable for extrusion or coextrusion. The extruded or coextruded film may be biaxially oriented in the machine and transverse directions under elevated temperature so as to form a multi-layer film. Although the preferred thermoplastic polymer of the core layer is a polypropylene homopolymer, other polymers may be used. These polymers include polymers made from one or more 2 to 4 carbon atom olefins, such as ethylene or butene-1, or a polymer made predominantly of propylene with minor amounts of another olefin, usually a 2 or 4 carbon atom olefin.

Optionally, the core layer comprises an antistatic agent in addition to the thermoplastic polymer. The antistatic agent may be selected from, e.g., glycerol monostearate (GMS) and a blend of GMS and tertiary amine. Suitable amounts for the antistatic agent may range from about 0.05% to about 3 weight %, based upon on the weight of the core layer.

A skin layer may comprise a polymer which is the same or different as the polymer of the core layer. Suitable polymers include an olefinic polymer, such as polypropylene or polyethylene. Other suitable polymers include a copolymer or terpolymer of ethylene, propylene and/or butylene and/or another olefin having 5 to 10 carbon atoms or a mixture of these olefin polymers. Particular skin layers comprise an ethylene homopolymer having a density of about 0.91 to about 0.96 g/cm$^3$, an ethylene-propylene copolymer in which the ethylene content is about 2 to about 10% by weight based upon the total weight of the copolymer, or an ethylene-propylene-butylene terpolymer in which the ethylene content is about 0.5 to about 7 weight % ethylene and about 5 to about 30 weight % butylene, each based upon the total weight of the terpolymer. Other resins used to form skin layers include ethylene-vinyl alcohol copolymer (EVOH) and ethylene vinylacetate copolymer (EVA).

In one embodiment, the multi-layer film may comprise (a) an upper skin layer which comprises a non-migratory polydimethylsiloxane block copolymer, (b) a core layer, and (c) a lower skin layer which is substantially free of nonmigratory polydimethylsiloxane block copolymer. As will be appreciated by those skilled in the art, the use of the terms upper and lower to refer to particular skin layers is merely relative. Moreover, although referred to as skin layers, the upper and lower layers may have additional structures bonded thereto, based on the functional requirements of the overall structure.

The polymer materials which may be used in forming skin layer (a) include heat sealable polyolefinic copolymers and terpolymers and blends thereof. The copolymers include block copolymers, for example of ethylene and propylene, and random copolymers, for example of ethylene and propylene. Terpolymers are exemplified by ethylene-propylene-butene-1 terpolymers. Also, heat sealable blends can be utilized in providing layer (a). Thus, along with the copolymer or terpolymer there can be polypropylene homopolymer, e.g., one which is the same as, or different from, the polypropylene homopolymer constituting core layer (b) or other material which does not impair the heat sealability of this layer.

Suitable ethylene-propylene-butene-1 (EPB) terpolymers include those obtained from the random interpolymerization of from about 1 to about 8 weight percent ethylene, preferably from about 3 to about 7 weight percent ethylene with from about 1 to about 10 weight percent butene-1, preferably from about 2 to about 8 weight percent butene-1, with propylene representing the balance. The foregoing EPB terpolymers may have a melt index at 230° C. of from about 2 to about 16, e.g., from about 3 to about 7, a crystalline melting point of from about 100° C. to about 140° C., an average molecular weight of from about 25,000 to about 100,000, and a density within the range of from about 0.89 to about 0.92 gm/cm$^3$.

The ethylene-propylene (EP) random copolymers may contain from about 2 to about 8 weight percent ethylene, e.g., about 3 to about 7 weight percent ethylene, the balance being made up of propylene. The copolymers may have a melt index at 230° C. ranging from about 2 to about 15 and preferably from about 3 to about 8. The crystalline melting point may be from about 125° C. to about 150° C. and the number average molecular weight range may be from about 25,000 to 100,000. The density may range from about 0.89 to about 0.92 gn/cm³.

When blends of EPB terpolymer and EP random copolymer are used, such blends may contain from about 10 to about 90 weight percent EPB terpolymer and preferably from about 40 to about 60 weight percent EPB terpolymer, the balance being made up of EP random copolymer.

Prior to extrusion, the heat seal layer (a) is compounded with an effective amount of a slip agent comprising a non-migratory polydimethylsiloxane block copolymer. By non-migratory, it is meant that these block copolymers do not change location throughout the layers of the film in the manner of the migratory slip agents, e.g., polydialkylsiloxane or fatty amides. The amount employed may range from about 0.01% to about 0.5% by weight, for example, about 0.1% to about 0.4% by weight, based upon the entire weight of the skin layer resin.

The polydialkylsiloxane block copolymer may be in the form of a di-block, tri-block, or star block copolymer. Either block component of the block copolymer may be compatible or incompatible with the polymer or polymers in the skin layer. Examples of the polydialkylsiloxane block copolymer include dimethylsiloxane-alkylene ether block copolymer; dimethylsiloxane-arylene ether block copolymer; dimethylsiloxane-vinyl block copolymer; dimethylsiloxane-ester block copolymer (such as bisphenol A carbonate-dimethylsiloxane block copolymer; 9,9-bis(4-hydroxyphenyl)fluorene carbonate dimethylsiloxane block copolymer, tetrabromobisphenol A carbonate dimethylsiloxane block copolymer; and 2,2,4,4-tetramethyl-1,3-cyclobutylene carbonate dimethylsiloxane block copolymer); aryl-alkyl phthalates dimethylsiloxane block copolymer (such as bisphenol A isophthalate dimethylsiloxane block copolymer; bisphenol A terephthalate dimethylsiloxane block copolymer; and hexamethylene terephthalate dimethylsiloxane block copolymer); polycaprolactam dimethylsiloxane block copolymer; polyurethane dimethylsiloxane block copolymer; dimethylsiloxane olefin block copolymer; and blends thereof Polymers for use in forming lower skin layer (c) include ethylene polymers such as linear low density polyethylene (LLDPE), low density polyethylene (LDPE), medium density polyethylene (MDPE), high density polyethylene (HDPE) or blends thereof Other resins include ethylene-vinyl alcohol copolymer (EVOH), ethylene-vinyl acetate copolymer (EVA) and polypropylene homopolymer. High density polyethylene may have a density ranging from between about 0.94 to 0.96 gm/cm³ and over. Skin layer (c) of the particular three-layered film structure described above is formed without adding the non-migratory polydimethylsiloxane block copolymer, which is included in the formulation of skin layer (a). Thus, skin layer (c) is considered to be substantially free of the non-migratory polydimethylsiloxane block copolymer used in skin layer (a). This does not, however, exclude the incidental presence of non-migratory polydimethylsiloxane block copolymer which might occur upon subsequent handling of the finished film, for example, upon winding the film onto a roll, whereby non-migratory polydimethylsiloxane block copolymer from skin layer (a) might be sloughed onto the external surface of or imbedded into skin layer (c). In one particular embodiment, skin layer (c) consists essentially of high density polyethylene.

Either or both layers (a) and (c) can also contain pigments, fillers, stabilizers, light protective agents or other suitable modifying ingredients if desired. Further, skin layers (a) and/or (c) can optionally contain a minor amount of an additional antiblock material, such as, clays, talc, glass, and the like. These antiblock materials can be used alone, or different sizes and shapes can be blended to optimize machinability. The major proportion of these particles, for example, anywhere from more than half to as high as 90 weight percent or more, may be of such a size that a significant portion of their surface area, will extend beyond the exposed surface of such skin layer.

The multi-layer film may have one or more additional layers in addition to core and skin layers. Such an additional layer may be comprised of a polypropylene homopolymer, such as highly crystalline polypropylene (HCPP), which may help to improve release properties of the film. HCPP polypropylene polymers include those having a decalin solubles content of about 1 to about 5% by weight, meso pentads equal to or greater than about 85% ($^{13}$C NMR spectroscopy), and a melt flow of about 2.5 to about 3 (as measured according to the standard ASTM D1238 test for polypropylene).

Suitable commercially available HCPP polymers include, but are not limited to, Amoco 9218 HCPP resin from BP-Amoco.

Additional layers may, optionally, contain a solid or liqiud antiblock. The solid antiblocks may be such that they do not substantially break up when subjected to mechanical stress like the particulate, partially cross-linked polysiloxanes described in U.S. Pat. No. 5,840,419. Suitable antiblocks include, but are not limited to, fully crosslinked or non-meltable polysiloxane, polymethyl methacrylate (PMMA) particles such as EPOSTAR® MA-1002 or silica particles such as SYLOBLOC 44 from W. R. Grace. Silicone oil is an example of a liquid antiblock. An example of a fully crosslinked or non-meltable polysiloxane is TOSPEARL T120A, available from Toshiba Silicone Company, Ltd.

The solid antiblock may be incorporated into the additional layer in an amount ranging from about 0.1 to about 0.5% by weight, preferably from about 0.15 to about 0.30% by weight, based on the entire weight of the additional layer.

Silicone oil, e.g. polydimethylsiloxane, may be used in the additional layer in a range from about 1,000 centistoke (cs) viscosity to about 100,000 cs viscosity. Preferred silicone oils are those having a viscosity of about 30,000 to about 60,000 cs, such as 20/30,0000 polydimethylsiloxane fluid from Dow-Coming or 200/60,0000 polydimethylsiloxane fluid from Dow-Corning.

The silicone oil may be incorporated into the additional layer in an amount ranging from about 0.1 to about 2% by weight, preferably from about 0.2 to about 0.8% by weight, based on the entire weight of the additional layer.

One or both of the skin layers may be a functional layer suitable for being treated for printing or sealing or by being a thermoplastic polymer which is printable or sealable without treatment. Such a functional layer may be selected from the group consisting of ethylene or propylene homopolymer, ethylene-propylene copolymer or ethylene-propylene-butylene terpolymer or a mixture of two or more of such homopolymer, copolymer or terpolymer. The surface of the functional layer may be treated by surface treatment which improves wettability and adhesion of printed matter (print may be by lithography, liquid or dry toner, thermal dyes, dye sublimation, etc.). In another embodiment, the functional layer is a cold seal adhesion promoting layer.

The functional layer may itself be printable or sealable or may be treated so as to provide sealability and/or printability. This treatment includes surface treatment of any kind known to enhance the surface tension properties such as flame or corona treatment. Other treatment methods include the application of a printable or sealable covering layer by way of any conventional extrusion or coating method. Certain water-based coatings are known for their utility as cold-sealable coatings or printable coatings. Examples include acrylic-based coatings including alkyl acrylate polymers and copolymers.

Sometimes it is useful to enhance or provide the film with certain properties by use of appropriate film additives. Such additives are used in effective amounts, which vary depending upon the property required, and are, typically selected from the group consisting of antistatic, antiblock, slip, antioxidant, moisture or gas barrier additives. These additives may be added to one or more layers of the film according to the present invention.

Useful antistatic additives which can be used in amounts ranging from about 0.05 to about 3 weight %, based upon the weight of the layer, include alkali metal sulfonates, polyether-modified polydiorganosiloxanes, polyalkylphenylsiloxanes and tertiary amines. As discussed previously for the core layer, the antistatic agent may be GMS or a blend of GMS and tertiary amine.

Useful antiblock additives used in amounts ranging from about 0.1 weight % to about 3 weight % based upon the entire weight of the layer include inorganic particulates such as silicon dioxide, e.g., a particulate antiblock sold by W. R. Grace under the trademark SYLOBLOC 44, Sipernat from Degussa, calcium carbonate, magnesium silicate, aluminum silicate, calcium phosphate, and the like (e.g. KAOPOLITE). Another useful particulate antiblock agent is TOSPEARL made by Toshiba Silicone Co., Ltd. and is described in U.S. Pat. No. 4,769,418. Another useful antiblock additive is a spherical particle made from methyl methacrylate resin having an average diameter of 1 to 15 microns, and such an additive is sold under the trademark EPOSTAR and is commercially available from Nippon Shokubai.

Slip additives include higher aliphatic acid amides, higher aliphatic acid esters, waxes and metal soaps, which can be used in amounts ranging from about 0.1 to about 2 weight percent based on the total weight of the layer. A specific example of a fatty amide slip additive is erucamide.

Antioxidants, such as phenolic antioxidants, may be used in amounts ranging from about 0.1 weight % to about 2 weight percent, based on the total weight of the layer. An example of an antioxidant is commercially available under the trademark IRGANOX 1010.

Barrier additives may be used and may include low-molecular weight resins, hydrocarbon resins, particularly petroleum resins, styrene resins, cyclopentadiene resins and terpene resins.

Optionally, the outer layers are compounded with a wax for lubricity. Amounts of wax range from about 2 to about 15 weight % based on the total weight of the layer.

The multi-layer film may also comprise additional coatings and/or layers such as an adhesive layer (e.g., a water-based urethane coating), a metallized polyester layer, and/or a cold seal layer (e.g., Technical Coatings 30061A, which is a pattern applied coating comprising polyisoprene and ethylene-vinyl acetate copolymer), as is well known in the art.

The film may be formed by coextruding the thermoplastic polymer-containing core layer together with the at least one skin layer and optional additional layers through a flat sheet extruder die at a temperature ranging from between about 200 to about 275° C., casting the film onto a cooling drum and quenching the film. The sheet may then be stretched about 4 to about 6 times in the machine direction (MD) orienter followed by stretching about 6 to about 10 times in the transverse direction (TD) orienter. The film may then be wound onto a reel. Optionally, one of the external surfaces is coated or flame or corona treated before winding (i.e., the surface of the functional skin layer). In addition, the production process may also be modified to include an adhesive layer on one or both surfaces of the multilayer polymeric film, a metallized polyester layer, and a cold seal layer.

An example of a multi-layer film comprises three layers: the core layer, an outermost skin layer comprising a non-migratory polydimethylsiloxane block copolymer, and an outermost skin later which is functional. However, it is contemplated that intermediate additional layers can be incorporated between the core layer and the outermost skin layers. The core layer may represent about 70 to about 90 percent of the thickness of the total multilayer polymeric film. The skin layers are usually coextensively applied to each major surface of the core layer, typically by coextrusion, as noted above. However, skin layers arrived at by coextrusion may not, ultimately, be the outermost layers.

EXAMPLE

A three layer coextruded biaxially oriented film was prepared with the structure A/B/C. The core layer B was a polypropylene homopolymer with a thickness of 20 μm. The A-skin layer was a high density polyethylene with a thickness of 2 μm. The C-skin layer was an ethylene-propylene-butene-1 terpolymer with a thickness of 2 μm.

The C-skin layer was loaded with 5000 ppm bisphenol A carbonate-dimethylsiloxane block copolymer and 1000 ppm Epostar 1004 (i.e. crosslinked polymethyl methacrylate with 4 μm spherical particles). The bisphenol A carbonate-dimethylsiloxane block copolymer had 65 wt % dimethylsiloxane. The average degree of polymerization of the silicone block was 20 and the average degree of polymerization of bisphenol A carbonate was 3.5.

What is claimed is:

1. A multilayer polymeric packaging film, for use in automatic packaging equipment, comprising:
    (a) a core layer comprising a thermoplastic polymer; and
    (b) at least one skin layer comprising a thermoplastic polymer and a non-migratory polydimethylsiloxane block copolymer, wherein said non-migratory polydimethylsiloxane block copolymer is selected from the group consisting of a di-block copolymer, a tri-block copolymer and a star-block copolymer, and said non-migratory polydimethylsiloxane block copolymer has at least a polyldimethylsiloxane block and a block which is not compatible with said thermoplastic polymer in said skin layer.

2. The multilayer polymeric film of claim 1, wherein said thermoplastic polymer of said core layer is a polypropylene homopolymer, an ethylene or butene-1 polymer, or a polymer made predominantly of propylene with minor amounts of ethylene or butene.

3. The multilayer polymeric film of claim 1, wherein said skin layer comprises an ethylene homopolymer having a density of about 0.91 to about 0.96 g/cm$^3$, an ethylene-propylene copolymer in which the ethylene content is about 2 to about 10% by weight based upon the total weight of the copolymer, or an ethylene-propylene-butylene terpolymer in which the ethylene content is about 0.5 to about 7 weight % ethylene and about 5 to about 30 weight % butylene, each based upon the total weight of the terpolymer.

4. The multilayer polymeric film of claim 1, wherein said non-migratory polydimethylsiloxane block copolymer is present in the skin layer in an amount ranging from about 0.01 to about 0.5% by weight, based on the entire weight of the skin layer.

5. The multilayer polymeric film of claim 1, wherein said skin layer is a heat sealable layer.

6. The multilayer polymeric film of claim 5, wherein the thermoplastic polymer in said skin layer comprises a heat sealable polymer selected from the group consisting of copolymers of ethylene and propylene and ethylene-propylene-butene-1 terpolymers.

7. The multilayer polymeric film of claim 5, wherein the thermoplastic polymer in said skin layer comprises an ethylene-propylene copolymer in which the ethylene content is about 2 to about 10% by weight based upon the total weight of the copolymer, or an ethylene-propylene-butylene terpolymer in which the ethylene content is about 0.5 to about 7 weight % ethylene and about 5 to about 30 weight % butylene, each based upon the total weight of the terpolymer.

8. The multilayer polymeric film of claim 6, wherein said non-migratory polydimethylsiloxane block copolymer is present in the skin layer in an amount ranging from about 0.1 to about 0.4% by weight, based on the entire weight of the skin layer resin.

9. The multilayer polymeric film of claim 1, wherein said non-migratory polydimethylsiloxane block copolymer is a di-block copolymer having a polydimethylsiloxane block and a block which is not compatible with said thermoplastic polymer in said skin layer.

10. The multilayer polymeric film of claim 1, which is biaxially oriented.

11. The multilayer polymeric film of claim 10, which is would into a reel and stored without film-to-film blocking.

12. A multilayer polymeric film comprising:

(a) a core layer comprising a thermoplastic polymer; and (b) at least one skin layer comprising a thermoplastic polymer and a non-migratory polydimethylsiloxane block copolymer, wherein said non-migratory polydimethylsiloxane block copolymer is selected from the group consisting of dimethylsiloxane-alkylene ether block copolymer; dimethylsiloxane-arylene ether block copolymer; dimethylsiloxane-vinyl block copolymer; dimethylsiloxane-ester block copolymer; aryl-alkyl phthalates dimethylsiloxane block copolymer; polycaprolactam dimethylsiloxane block copolymer; polyurethane dimethylsiloxane block copolymer; and blends thereof.

13. The multilayer polymeric film of claim 12, wherein said skin layer is a heat sealable layer.

14. The multilayer polymeric film of claim 12, which is biaxially oriented.

15. The multilayer polymeric film of claim 12, wherein said non-migratory polydimethylsiloxane block copolymer is present in the skin layer in an amount ranging from about 0.01 to about 0.5% by weight, based on the entire weight of the skin layer resin.

16. A multilayer polymeric film comprising:

(a) a core layer comprising a thermoplastic polymer; and (b) at least one skin layer comprising a thermoplastic polymer and a non-migratory polydimethylsiloxane block copolymer, wherein said non-migratory polydimethylsiloxane block copolymer is selected from the group consisting of bisphenol A carbonate-dimethylsiloxane block copolymer; 9,9-bis(4-hydroxyhenyl)fluorene carbonate dimethylsiloxane block copolymer; tetrabromobisphenol A carbonate dimethylsiloxane block copolymer; 2,2,4,4-tetramethyl-1,3-cyclobutylene carbonate dimethylsiloxane block copolymer; bisphenol A isophthalate dimethylsiloxane block copolymer; bisphenol A terephthalate dimethylsiloxane block copolymer; hexamethylene terephthalate dimethylsiloxane block copolymer; and blends thereof.

17. The multilayer polymeric film of claim 16, wherein said skin layer is a heat-sealable layer.

18. The multilayer polymeric film of claim 17, wherein said thermoplastic polymer in said skin layer comprises a heat-sealable polymer selected from the group consisting of (i) copolymers of ethylene and propylene, (ii) ethylene-propylene-butene-1 terpolymers, and (iii) blends thereof.

19. The multilayer polymeric film of claim 16, wherein said non-migratory polydimethylsiloxane: block copolymer is present in the skin layer in an amount ranging from about 0.01 to about 0.5% by weight, based on the entire weight of the skin layer resin.

20. The multilayer polymeric film of claim 16, which is biaxially oriented.

* * * * *